US010366418B1

(12) United States Patent
Isenberg et al.

(10) Patent No.: US 10,366,418 B1
(45) Date of Patent: Jul. 30, 2019

(54) METHOD AND SYSTEM FOR PROVIDING A RELEVANT MESSAGE USING A SMART RADIO

(71) Applicants: Steven M Isenberg, Lexington, MA (US); Irena Shaigorodsky, Needham, MA (US); Alvin Dale Black, Spanish Fork, UT (US)

(72) Inventors: Steven M Isenberg, Lexington, MA (US); Irena Shaigorodsky, Needham, MA (US); Alvin Dale Black, Spanish Fork, UT (US)

(73) Assignee: CA, Inc., New York, NY (US)

( * ) Notice: Subject to any disclaimer, the term of this patent is extended or adjusted under 35 U.S.C. 154(b) by 413 days.

(21) Appl. No.: 13/906,260

(22) Filed: May 30, 2013

(51) Int. Cl.
*G06Q 30/02* (2012.01)

(52) U.S. Cl.
CPC ..... *G06Q 30/0266* (2013.01); *G06Q 30/0251* (2013.01); *G06Q 30/0261* (2013.01); *G06Q 30/0265* (2013.01); *G06Q 30/0267* (2013.01); *G06Q 30/0269* (2013.01); *G06Q 30/0271* (2013.01)

(58) Field of Classification Search
CPC .......... G06Q 30/0251; G06Q 30/0261; G06Q 30/0265; G06Q 30/0266; G06Q 30/0267; G06Q 30/0269; G06Q 30/0271
See application file for complete search history.

(56) References Cited

U.S. PATENT DOCUMENTS

| 2002/0095228 | A1* | 7/2002 | Corts | H04H 20/10 700/94 |
| 2002/0141491 | A1* | 10/2002 | Corts | G06Q 30/0269 375/216 |
| 2003/0229446 | A1* | 12/2003 | Boscamp | G01C 21/26 701/469 |

(Continued)

OTHER PUBLICATIONS

Goldwerger, Eyal, "TargetSpot Bringing Deeper Audience Targeting to Internet Radio Advertising Says CEO Goldwerger", Aug. 27, 2009, adexchanger.com, "https://adexchanger.com/digital-audio-radio/targetspot-internet-radio-advertising/" (Year: 2009).*

(Continued)

*Primary Examiner* — Scott D Gartland
*Assistant Examiner* — Jonathan J Whitaker
(74) *Attorney, Agent, or Firm* — Baker Botts L.L.P.

(57) ABSTRACT

Methods include obtaining client data corresponding to a client. Methods further include determining one or more areas of interest of the client using the client data. Methods further include obtaining location data corresponding to the client. The location data comprises a geographic location of the client and a current direction of movement of the client. Methods further include determining one or more potential locations of the client using the location data. Methods further include receiving a plurality of commercial messages from a central control center, each of the plurality of commercial messages associated with a plurality of tags. Methods further include identifying a relevant commercial message from the plurality of commercial messages, such (Continued)

that the relevant commercial message is associated with a tag corresponding to at least one of the one or more areas of interest and a tag corresponding to at least one of the one or more potential locations.

19 Claims, 8 Drawing Sheets

(56) References Cited

U.S. PATENT DOCUMENTS

| | | | | |
|---|---|---|---|---|
| 2007/0250901 | A1* | 10/2007 | McIntire | H04N 7/17318 725/146 |
| 2008/0077956 | A1* | 3/2008 | Morrison | H04N 7/17318 725/38 |
| 2008/0153442 | A1* | 6/2008 | Chen | H04N 7/147 455/187.1 |
| 2009/0234727 | A1* | 9/2009 | Petty | G06F 17/30306 705/14.54 |
| 2010/0036717 | A1* | 2/2010 | Trest | G06Q 30/0207 705/14.1 |
| 2010/0042411 | A1* | 2/2010 | Addessi | G10L 13/00 704/270 |
| 2010/0131365 | A1* | 5/2010 | Subramanian | G06Q 30/02 705/14.55 |
| 2010/0185517 | A1* | 7/2010 | Higgins | G06Q 30/0261 705/14.58 |
| 2011/0178873 | A1* | 7/2011 | Lagudi | G06Q 30/02 705/14.54 |
| 2012/0054028 | A1* | 3/2012 | Tengler et al. | 705/14.49 |
| 2012/0089462 | A1* | 4/2012 | Hot | 705/14.62 |
| 2012/0123904 | A1* | 5/2012 | Foerster | G06Q 30/0625 705/26.62 |
| 2012/0158289 | A1* | 6/2012 | Bernheim Brush | G01C 21/3484 701/425 |
| 2013/0059607 | A1* | 3/2013 | Herz et al. | 455/456.3 |
| 2013/0066720 | A1* | 3/2013 | Schwarz | G06Q 30/02 705/14.53 |
| 2013/0254038 | A1* | 9/2013 | Bradley | G06Q 30/0267 705/14.64 |

OTHER PUBLICATIONS

"The Influence of Digital Radio on the Advertising Marker", May 30, 2013, worlddab.org, "https://www.worlddab.org/public_document/file/375/Digital_Radio_Revenue_opportunities_May_2013.pdf?1377875967" (Year: 2013).*

* cited by examiner

US 10,366,418 B1

METHOD AND SYSTEM FOR PROVIDING A RELEVANT MESSAGE USING A SMART RADIO

BACKGROUND

The present disclosure relates to cloud computing and, more specifically, to a method and system for providing a relevant message using a smart radio.

Existing communication systems provide information to clients over a network. The information may include advertisements or commercial messages. A particular commercial message may be used to inform clients about a product or service being offered by a commercial entity. The commercial entity may provide monetary compensation to a central control center or a broadcast station to have the particular commercial message delivered to clients in a network. Typically, a central control center stores a plurality of commercial messages in a repository. The central control center transmits one or more of the plurality of commercial messages to a broadcast station in a network. The broadcast station subsequently transmits the one or more of the plurality of commercial messages to clients in the network.

BRIEF SUMMARY

According to an aspect of the present disclosure, a method may comprise obtaining client data corresponding to a client. The method may further comprise determining one or more areas of interest of the client using the client data. The method may further comprise obtaining location data corresponding to the client. The location data may comprise a geographic location of the client and a current direction of movement of the client. The method may comprise determining one or more potential locations of the client using the location data. The method may further comprise receiving a plurality of commercial messages from a central control center. Each of the plurality of commercial messages may be associated with a plurality of tags. The method may comprise identifying a relevant commercial message from the plurality of commercial messages, such that the relevant commercial message is associated with a tag corresponding to at least one of the one or more areas of interest and a tag corresponding to at least one of the one or more potential locations.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
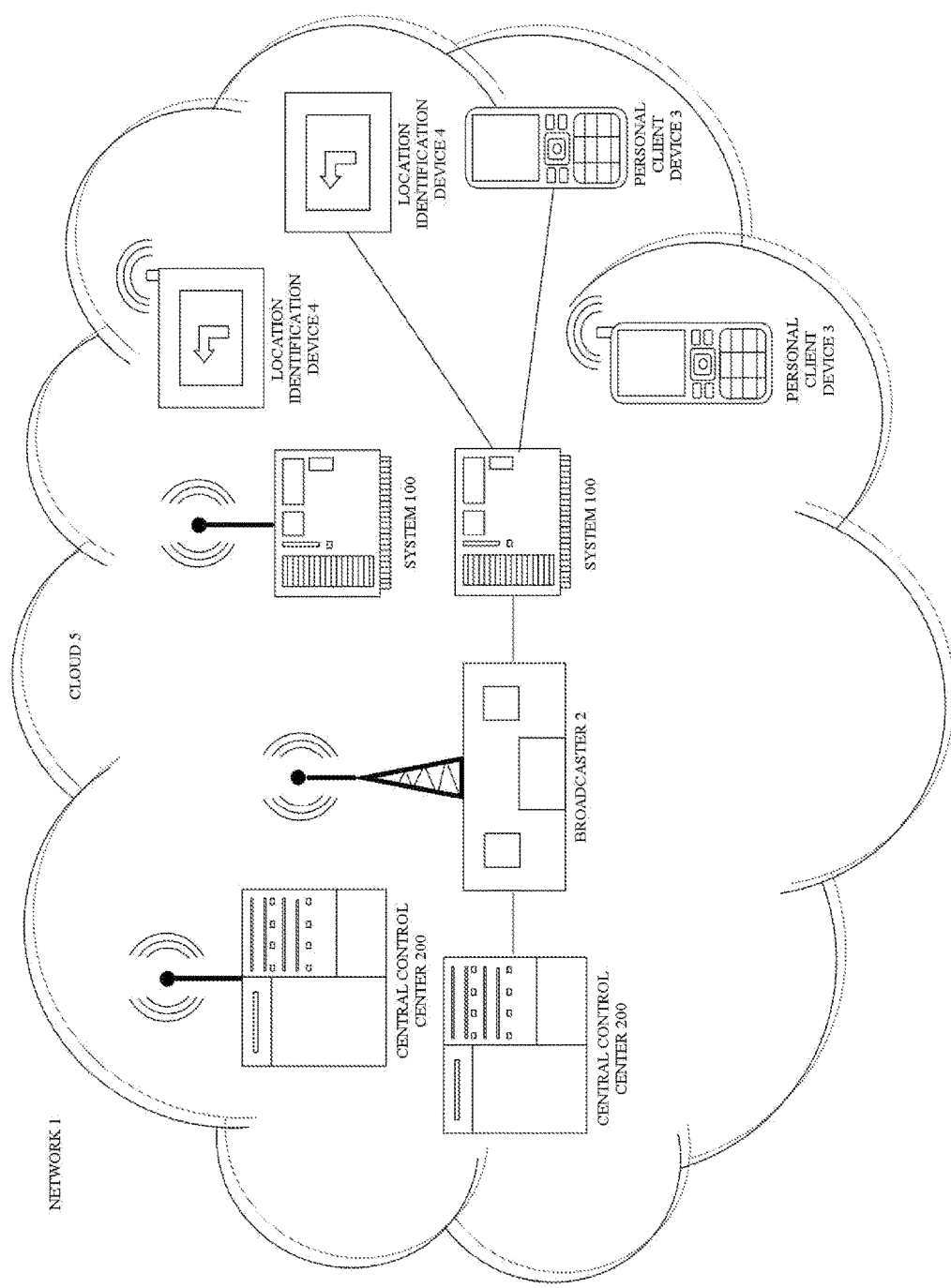
FIG. 1 is a schematic representation of a network 1 for providing a relevant commercial message.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to cloud computing and vertical specific technology applications, systems and methods disclosed herein may also be related to cloud environments; security management; mobility; architecture; database management; data modeling and analysis; governance; risk and compliance; project, portfolio, and financial management; software engineering; big data; application development and databases; information technology ("IT") service and asset management; middleware and common services; usability and user experience; application performance management; service assurance; alternative software delivery method; emerging technologies; mainframe; deployment; virtualization; and infrastructure and operations management. Systems and methods disclosed herein may be applicable to a broad range of applications that monitor various parameters associated with various disciplines, such as, for example, commercial and promotional activities and other activities of importance to the user.

Referring now to cloud computing, commercial entities may want to deliver commercial messages to one or more clients. The commercial messages may contain information about products or services that are being offered by the commercial entities. The commercial entities may use the commercial messages to inform clients about their products or services. For example, an owner of a beef barbecue restaurant chain may want to inform clients about menu items that are served at its restaurant locations. By informing clients about their products or services, the commercial entities may anticipate that a subset of those clients may want to acquire and use one of their products or services.

Existing systems may deliver commercial messages to clients via a radio system. A central control center may store the commercial messages in a repository. The central control center may transmit the commercial messages to a broadcast station. The broadcast station may be a radio station or other type of media broadcast station. The broadcast station may subsequently retransmit the commercial messages to clients. A commercial entity that wants to have a particular commercial message delivered may provide that particular commercial message to the central control center, the broadcast station, or a party affiliated with the central control center or broadcast station. The commercial entity may provide monetary compensation to the central control center, the broadcast station, or the affiliated party to have the particular commercial message delivered to clients.

Such systems may be able to deliver commercial messages to a large number of clients. However, commercial entities may want to ensure that their commercial messages are delivered to clients who may be interested in the products and services that are advertised in their commercial messages. For example, a commercial entity may want to ensure that its commercial message is delivered to clients that are located near an establishment belonging to or operated by the commercial entity. As another example, a commercial entity may want to ensure that its commercial message is delivered to clients that may have a preference for or an interest in the product or service being offered by the commercial entity (e.g., clients that have previously expressed an interest in commercial offerings that are similar to the product or service being offered by the commercial entity). These commercial entities may be willing to provide additional monetary compensation for having their commercial messages delivered to interested clients.

In addition, clients that receive commercial messages from a broadcast station may want to receive commercial messages that are targeted to their interests. For example, a client may want to receive a commercial message that informs the client about a product or service being offered at an establishment that the client will shortly come across. As another example, a client may want to receive a commercial message that informs the client about a product or service that the client may find interesting or useful. Similar to commercial entities, these clients may be willing to provide monetary compensation for receiving commercial messages that are of interest to them.

In general, advertising may be more effective when the commercial messages or advertisements presented to a client are those that the client are interested in or can take advantage of. For example, presenting a commercial message about a beef barbecue restaurant chain that is located on the West Coast of the United States to a vegetarian currently located on the East Coast of the United States (e.g., an individual currently driving on Route 128 in Massachusetts) may be ineffective and a waste of advertising money. The vegetarian located on the East Coast may not be interested in a meat-centric restaurant located on the West Coast. Thus, the advertising money that the beef barbecue restaurant chain spent on presenting the commercial message to the vegetarian would not persuade the vegetarian to purchase any food items being offered by the beef barbecue restaurant chain. Accordingly, commercial entities may find it more effective to have messages that are targeted to a client's interests delivered to that client. Similarly, clients receiving commercial messages may prefer to receive commercial messages that are targeted to their interests.

Systems and methods disclosed herein may provide appropriately timed and placed advertisements. In particular, such systems and methods may use location data and client data to provide targeted advertising. Such systems and methods may obtain location data of a client. The location data may comprise a current location of the client and a direction that the client is moving. If the client is driving a vehicle, such systems and methods may determine a direction of vehicle travel (e.g., a direction that the vehicle is travelling). The location data may be obtained from a Global Positioning System device ("GPS") located on the vehicle. Moreover, such systems and methods may obtain client data of the client. The client data may comprise a name of the client, an address, a club or store membership, an interest, and other attributes of the client. The client data may be obtained from a BLUETOOTH® device or other wireless device (e.g., a smartphone). Such systems and methods may use the client data to determine one or more areas of interests of the client.

Such systems and methods may subsequently use the location data and the client data to identify and present appropriately timed and placed commercial messages. Thus, instead of presenting the commercial message for a beef barbecue restaurant chain located on the West Coast to the vegetarian on the East Coast, such systems and methods may, for example, present a commercial message for a vegetarian restaurant located close to the vegetarian (e.g., if the vegetarian is currently driving northbound on Route 128 and approaching Newton, Mass., the commercial message may be for a Veggie-Plus Restaurant located on Route 9 in Newton, Mass.). Then, at a later time, when the vegetarian is passing by Lexington, Mass. on his way to Burlington and Woburn, Mass., other commercial messages for vegetarian eateries in the Burlington Mall and the Woburn Mall may be presented. If the vegetarian has a teenage daughter, such systems and methods may also present commercial messages for teenage clothing stores in the Burlington Mall and the Woburn Mall to the vegetarian.

Systems and methods disclosed herein may present audible or visual commercial messages. Visual commercial messages may be presented on a display at any time. A client viewing a visual commercial message may have an option of clicking on the visual commercial message to view more details about a commercial offering. Audible commercial messages may be presented by a radio or other type of audio device. The radio or other audio device may play an audible commercial message when triggered by a radio station (e.g., after receiving a signal to present an audible commercial message from the radio station). For example, an operator at the radio station (e.g., a disc jockey) may say, "We'll be back after this word from our sponsors," and press a button that would send a coded signal to the radio or other audio device. Upon receiving the signal from the radio station, the radio or other audio device may then play the audible commercial message.

By presenting appropriately timed and placed commercial messages, such systems and methods may help commercial entities ensure that their commercial messages are targeted to an interested audience. Unlike existing systems and methods, such systems and methods may provide commercial entities with more control over their audience. Accordingly, commercial entities may be willing to pay more for each time one of their commercial messages is presented to a client. Thus, media broadcasters (e.g., radio broadcasters) and other advertising service providers may obtain more revenue by implementing such systems and methods disclosed herein.

Systems and methods disclosed herein may comprise a smart radio in a vehicle (e.g., a car, a truck). The smart radio may function as a regular radio, a satellite radio, or other existing radio. For example, the smart radio may receive radio waves containing music and other information from a radio station and play the music and other information over a speaker. The radio station may receive a broadcast signal containing the music and other information from a central broadcast station and transmit radio waves containing the music and other information to the smart radio through a primary communication channel. Additionally, the smart radio may provide appropriate or relevant commercials to one or more clients in the vehicle. In particular, the smart radio may determine a current location and a direction of travel of the vehicle in real-time. The current location and the direction of travel of the vehicle may be referred to as "travel information." The smart radio may further determine identities and interests of one or more clients (e.g., people) in the vehicle by using, for example, BLUETOOTH® technology to connect to one or more wireless devices (e.g., smartphones) belonging to the one or more clients in the vehicle. Alternatively, the smart radio may refer to information that a client has inputted into the smart radio or is already stored in the smart radio to determine the identities and the interests of the one or more clients. The identities and the interests of the one or more clients may be referred to as "personal information."

The smart radio may then receive a plurality of commercial messages from a central control center. Upon receiving the plurality of commercial messages, the smart radio may use the travel information and the personal information to filter appropriate commercial messages from the plurality of commercial messages. These appropriate commercial messages may subsequently be stored in the smart radio (e.g., stored in a memory in the smart radio). If the appropriate commercial messages are audible commercial messages, then the smart radio may continue to function as a regular radio until it receives a signal from the radio station or other party instructing it to play the appropriate commercial messages. After receiving such a signal, the smart radio may play the appropriate commercial messages to the one or more clients in the vehicle. The smart radio may subsequently communicate to the central control center that a particular commercial message in the plurality of commercial messages was played at a given time and place to the one or more clients. Alternatively, if the appropriate commercial messages are visual commercial messages, then the smart radio may present the appropriate commercial messages on an in-vehicle display.

In other systems and methods disclosed herein, the smart radio may communicate or transmit the travel information and the personal information to the central control center.

The central control center may have a repository where a plurality of commercial messages are stored or held. Upon receiving the travel information and the personal information, the central control center may use the communicated information to identify appropriate or pertinent commercial messages to transmit to the smart radio. The appropriate commercial messages may be commercial messages that are appropriate based on the current location and the direction of travel of the vehicle. The appropriate messages may further be commercial messages that are best attuned to the interests of the one or more clients in the vehicle. The central control center may subsequently transmit these appropriate commercial messages to the smart radio through a secondary communication channel. This secondary communication channel may be different from the primary communication channel. After receiving the appropriate commercial messages, the smart radio may present the appropriate commercial messages to the one or more clients. The central control center may then receive information from the smart radio that indicates that a particular commercial message in the plurality of commercial messages was played at a given time and place to the one or more clients. An advertiser (e.g., commercial entity) may have wanted the particular commercial message to be presented to one or more clients. Thus, after receiving such information, the central control center or a party affiliated with the central control center may use the information to bill the advertiser.

In systems and methods disclosed herein, commercial messages may be indexed with one or more tags that correspond to a target interest or a target location. For example, a commercial message for a truck stop in Newton, Mass. may be indexed with a tag corresponding to trucks and a tag corresponding to Newton, Mass. In such systems and methods, advertisers may contract to have their commercial messages delivered to particular clients. In particular, advertisers may specify demographics and locations appropriate for presenting their commercial messages. For example, an advertiser may specify that truck drivers located in Newton, Mass. should be presented with its commercial message for a truck stop in Newton, Mass. Accordingly, a truck driver in Newton, Mass. may receive a commercial for the truck stop, which the truck driver may be driving by in ten minutes. As another example, an advertiser may specify that families with children located in Newton, Mass. should be presented with its commercial message for a family entertainment center (e.g., Chuck E. Cheese's) located in Newton, Mass. Accordingly, a family with children in Newton, Mass. may receive a commercial for the family entertainment center, which the family may be coming across in a few miles.

Referring now to FIG. 1, a network 1 for providing a relevant commercial message now is described. Network 1 may comprise one or more clouds 5, which may be public clouds, private clouds, or community clouds. Each cloud 5 may permit the exchange of information and services among service providers, information providers, and clients that are in such clouds 5 (e.g., service providers, information providers, and clients utilizing devices that are connected to clouds 5). In certain configurations, cloud 5 may be a wide area network, such as the Internet. In some configurations, cloud 5 may be a local area network, such as an intranet. Further, cloud 5 may be a closed, private network in certain configurations, and cloud 5 may be an open network in other configurations. Cloud 5 may facilitate wired or wireless communications of information and provisioning of services among clients that are in cloud 5.

Network 1 may comprise a broadcaster 2. Broadcaster 2 may comprise a central broadcast station (not shown) and one or more local broadcast stations (not shown). Broadcaster 2 may be a radio broadcaster or a television broadcaster. The central broadcast station may transmit a signal to a local broadcast station, in which the signal comprises programming or other content. The local broadcast station may subsequently transmit the programming or other content to other devices in cloud 5. Network 1 may further comprise one or more devices operated by clients. These one or more devices may comprise personal client devices 3 and location identification devices 4. Personal client devices 3 may be general purpose computing devices, specialized computing devices, mobile devices, wireless devices, wired devices, and other devices equipped with BLUETOOTH® technology, near field communication technology ("NFC"), or other information communication technology. Location identification devices 4 may be navigation devices that use radio signals via mobile phone tracking, Global Positioning System ("GPS") signals, or WiFi signals to ascertain their current positions. Clients may utilize personal client devices 3, location identification devices 4, and other devices in cloud 5.

Moreover, network 1 may comprise one or more systems 100 that may collect information from network 1, cloud 5, broadcaster 2, personal client devices 3, location identification devices 4, and other devices in cloud 5. System 100 may be, for example, one or more of a general purpose computing device, a specialized computing device, a wired device, a wireless device, a mainframe device, an infrastructure device, a monitoring device, and any other device configured to collect data from one or more data sources (e.g., servers, sensors, networks, interfaces, other devices). System 100 may monitor network 1, broadcaster 2, personal client devices 3, location identification devices 4, and other devices in cloud 5 for available information about clients in cloud 5 (e.g., location data, client data) and services and information provided to clients in cloud 5 (e.g., commercial messages, associated costs). By collecting available information from network 1, cloud 5, broadcaster 2, personal client devices 3, location identification devices 4, and other devices connected to cloud 5, system 100 may be able to determine clients' potential locations and areas of interest. System 100 may subsequently provide relevant commercial messages to clients based on their potential locations and areas of interest.

In addition, network 1 may comprise one or more central control centers 200. Central control center 200 may provide commercial messages and other content to broadcaster 2, system 100, and clients in cloud 5. Central control center 200 may be, for example, an advertising server (e.g., a server that stores and delivers commercial messages), an advertising network (e.g., Google AdWords, Yahoo! Publisher Network), a daily deal website (e.g., Groupon, LivingSocial), or other entity that provides advertising services. Central control center 200 may receive available information (e.g., location data, client data) from broadcaster 2, system 100, personal client devices 3, location identification devices 4, and other devices connected to cloud 5 and analyze the available information. By analyzing the available information, central control center 200 may identify a plurality of commercial messages to transmit to broadcaster 2, system 100, and clients in cloud 5.

Figure 2:
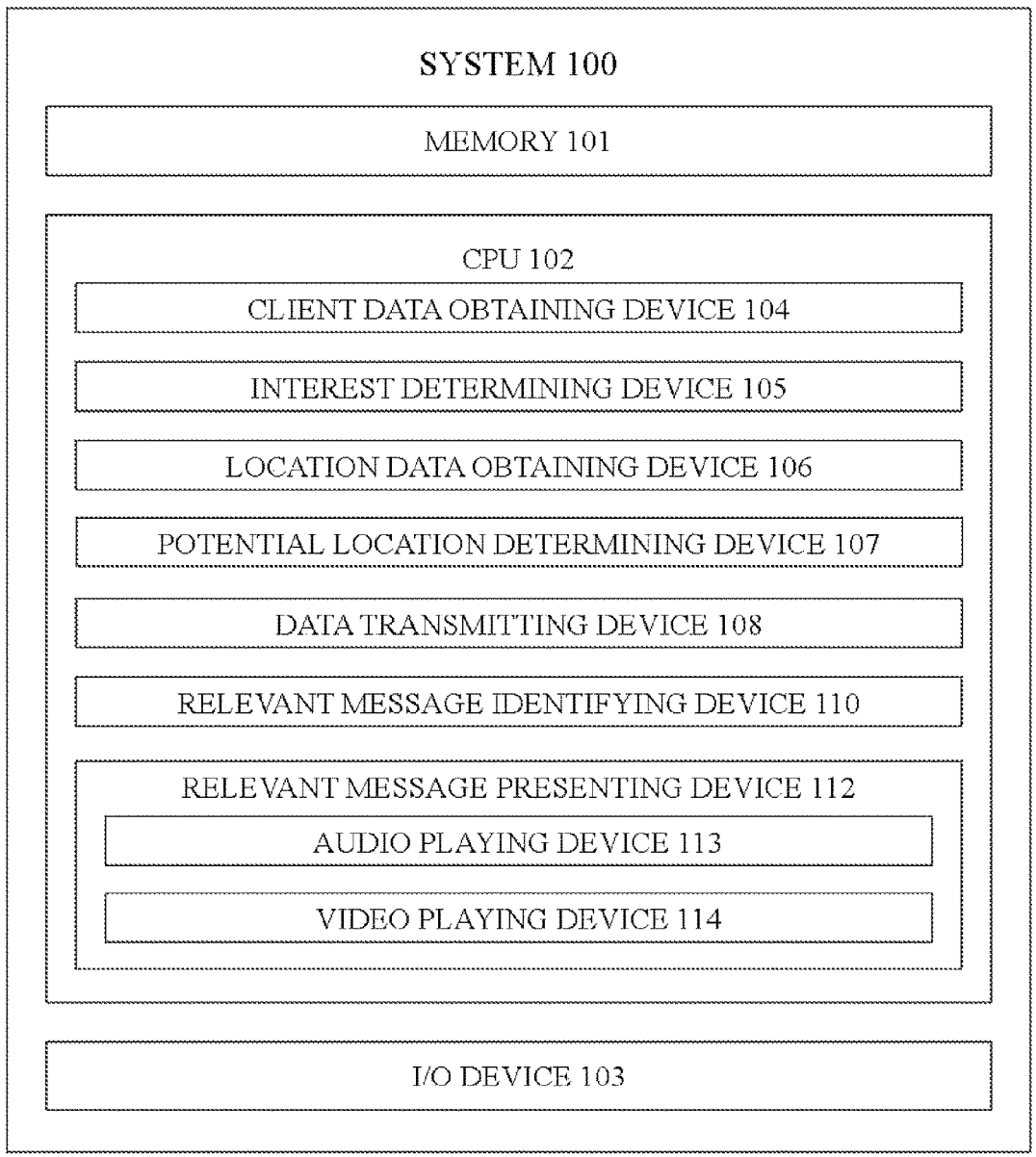
FIG. 2 is a schematic representation of a system configured to monitor devices associated with a client for client data and location data of the client and to use the client data and location data to provide one or more relevant commercial messages.

Referring now to FIG. 2, system 100, which may collect data from network 1, cloud 5, radio broadcaster 2, personal client devices 3, location identification devices 4, other devices connected to cloud 5, and other devices connected with or incorporated into system 100, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a client data obtaining device 104, an interest determining device 105, a location data obtaining device 106, a potential location determining device 107, a data transmitting device 108, a relevant message identifying device 110, and a relevant message presenting device 112. Message presenting device 112 may comprise an audio playing device 113 and a video playing device 114. In particular configurations, one or more of client data obtaining device 104, interest determining device 105, location data obtaining device 106, potential location determining device 107, data transmitting device 108, relevant message identifying device 110, and relevant message presenting device 112 may be implemented on one or more different CPUs, which may be comprised in remote or local devices.

I/O device 103 may receive one or more of data from cloud 5, data from other devices and sensors connected to system 100, and input from a user and provide such data to CPU 102. I/O device 103 may transmit data to cloud 5, may transmit data to other devices connected to system 100, and may transmit data to a client (e.g., display a message, play a message). Further, I/O device 103 may implement one or more of wireless and wired communication between system 100 and other devices.

Figure 3:
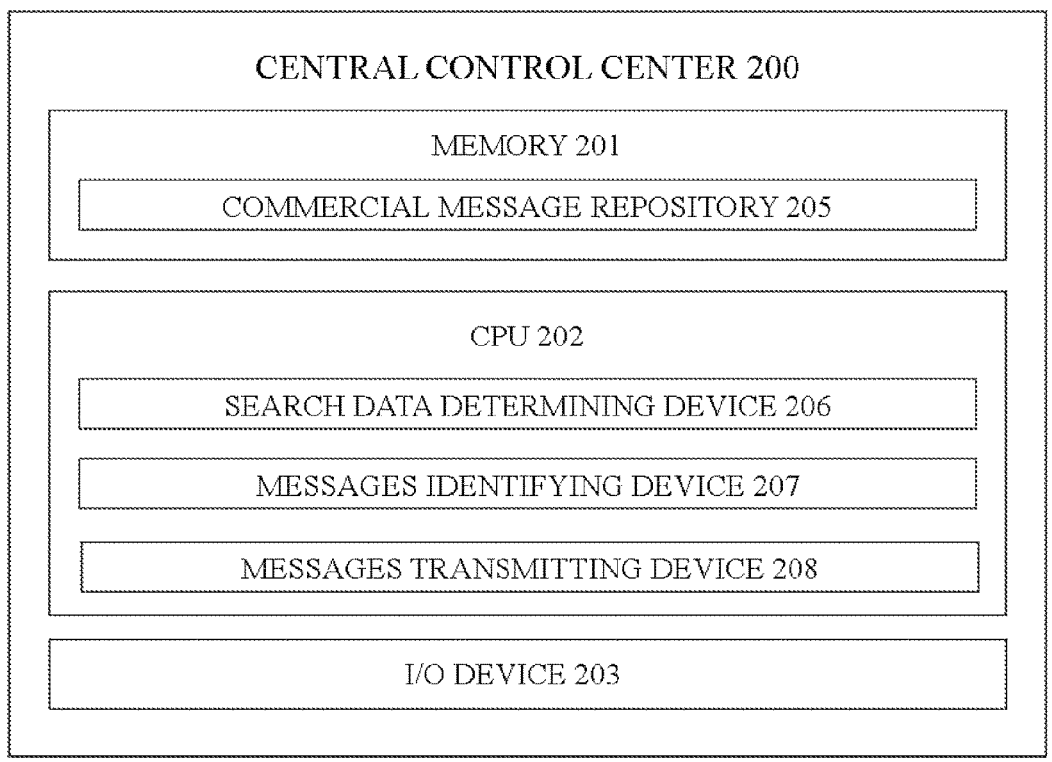
FIG. 3 is a schematic representation of a central control center configured to identify a plurality of commercial messages.

Referring now to FIG. 3, central control center 200, which may be configured to identify a plurality of commercial messages, now is described. Central control center 200 may comprise a memory 201, a CPU 202, and I/O device 203. Memory 201 may be a data storage device such as a server, random access memory ("RAM"), or a hard drive. Memory 201 may comprise a commercial message repository 204 in which commercial messages are stored. The commercial messages may comprise audio data or video data. The commercial messages may provide information about commercial offerings. In particular, the commercial messages may promote, advertise, or market one or more commercial offerings. Moreover, each of the commercial messages may be associated with one or more tags. The one or more tags may be terms or phrases that describe a commercial message (e.g., metatdata). Specifically, the commercial message may provide information about a particular commercial offering, and the one or more tags may identify locations or areas of interest related to that particular commercial offering.

Memory 201 may also store computer-readable instructions that may instruct central control center 200 to perform certain processes. In particular, when executed by CPU 202, the computer-readable instructions stored in memory 201 may instruct CPU 202 to operate as one or more devices. In FIG. 3, CPU 202 may operate as one or more of a client data determining device 206, a messages identifying device 207, and a messages transmitting device 208. In particular configurations, one or more of data analyzing device 206 and messages identifying device 207 may be implemented on one or more different CPUs, which may be comprised in remote or local devices.

I/O device 203 may receive one or more data from broadcaster 2, system 100, personal client devices 3, location identification devices 4, and other devices connected to cloud 5 and provide such data to CPU 202. I/O device 203 may transmit data to cloud 5, may transmit data to other devices connected to system 100, and may transmit data to a client (e.g., display a message, play a message). Further, I/O device 103 may implement one or more of wireless and wired communication between central control center 200 and other devices.

Figure 5:
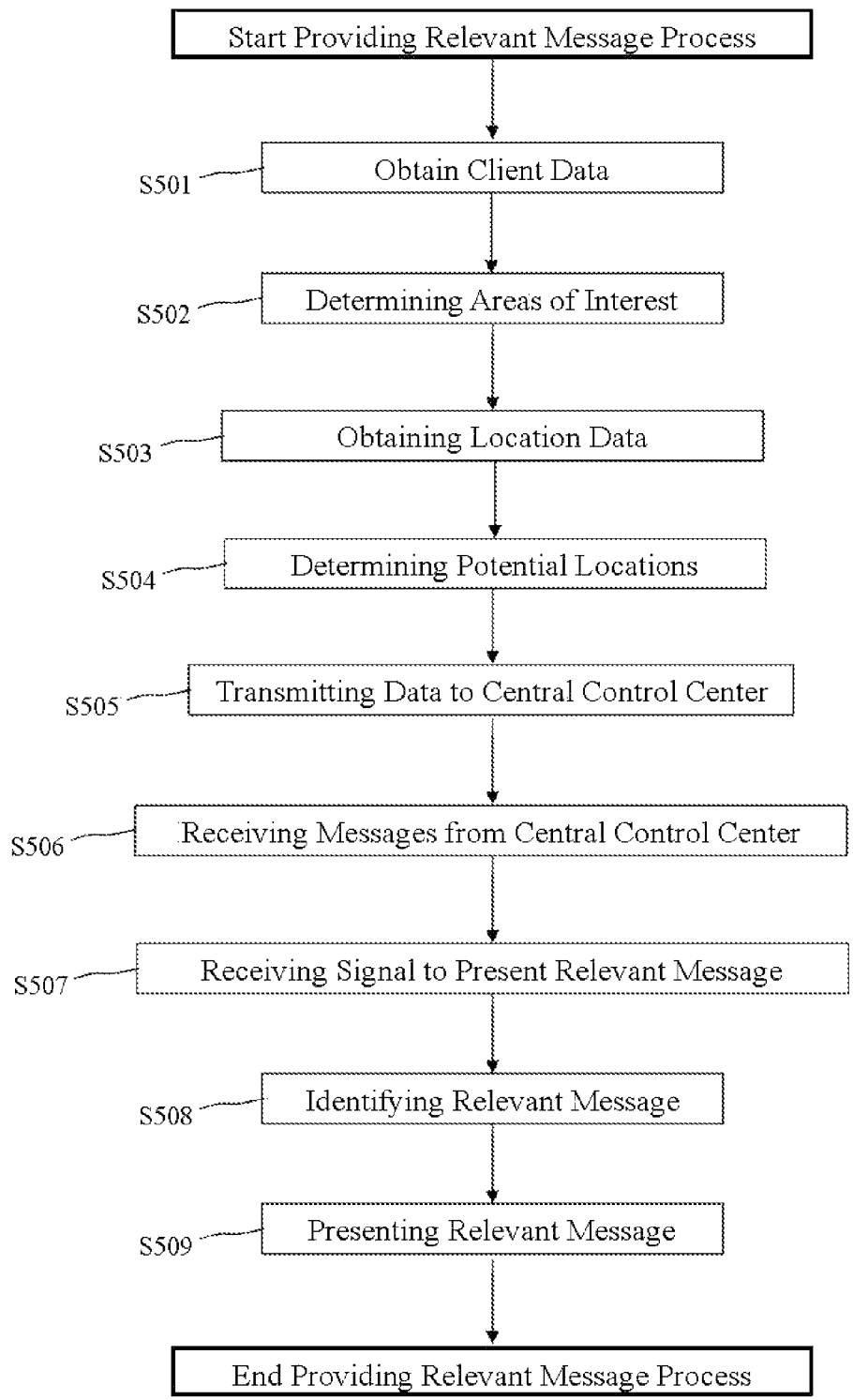
FIG. 5 illustrates a process of obtaining client data and location data of a client and using the client data and location data to provide a relevant commercial message.

Referring now to FIGS. 5-8, processes performed by client data obtaining device 104, interest determining device 105, location data obtaining device 106, potential location determining device 107, data transmitting device 108, relevant message identifying device 110, and relevant message presenting device 112 now are described. FIG. 5 depicts a process of obtaining client data and location data of a client and using the client data and location data to provide a relevant commercial message. In S501, client data obtaining device 104 may obtain client data of a client. The client may be a buyer or receiver of commercial offerings (e.g., goods, services). Client data may comprise information about the client's identity or attributes (e.g., name, gender, age, profession). Client data may also comprise information about the client's activities. For example, the client data may comprise internet browsing history (e.g., a list of internet sites that the client has recently visited), purchase history (e.g., a list of commercial offerings that the client has recently purchased), or a playlist (e.g., a list of musical selections, videos, or other media that the client listens to). Client data may further comprise information about a device's attributes, wherein the device is associated with the client. The device may comprise, for example, a vehicle, a mobile phone, or other device that is being operated by the client or belongs to the client. Thus, if the device is a vehicle that is being operated by the client, then the vehicle's attributes may comprise a make of the vehicle, a model of the vehicle, a year of the vehicle, or a type of the vehicle.

Obtaining client data may comprise transmitting a request for client data to a device associated with the client. In particular, I/O device 103 may transmit a message to a wireless device (e.g., a personal client device 3) that is associated with the client (e.g., belongs to the client). The message may comprise the request for client data. Upon receiving the message, the device may identify and transmit client data to I/O device 103. I/O device 103 may then provide the client data to client data obtaining device 104. Alternatively, obtaining client data may comprise using a voice recognition device to identify the client. After identifying the client, client data obtaining device 104 may then locate client data of the client on a local repository or a remote repository. This client data may have been previously provided by the client or received from a wireless device associated with the client.

In S502, interest determining device 105 may determine one or more areas of interest of the client using the client data. Areas of interest may comprise preferences for an object, activity, cause, or quality. For example, an area of interest may be a class of products (e.g., cars, organic foods, electronics), a sport (e.g., swimming, basketball, racing), a hobby (e.g., cooking, painting, reading), a personal practice or belief (e.g., vegetarianism, religious or cultural beliefs, principles such as animal rights). Determining one or more areas of interest may comprise identifying areas of interest that are associated with a particular attribute of the client. For example, if the client is a vegetarian, then an area of interest may be vegetarianism. As another example, if the client is a pet owner, then an area of interest may be pet food. Determining one or more areas of interest may also comprise identifying areas of interest based on the client's activities. For example, if the client recently visited several websites for shoes, then an area of interest may be shoes. As another example, if the client recently posted about income taxes on a website (e.g., a personal blog), then an area of interest may be "tax preparation services."

In S503, location data obtaining device 106 may obtain location data of the client. Location data may comprise a geographic location of the client (e.g., an absolute location, a relative location), a current direction of movement of the client, and a speed of movement of the client. For example, if a client is driving on Route 9, a mile away from Newton, Mass., travelling towards the east, then the geographic location of the client may be "a mile to the west of Newton" and the current direction of movement of the client may be "eastbound." Then, if the client is travelling at 55 miles per hour ("mph"), the speed of movement of the client may be "55 miles per hour." Obtaining location data may be similar to obtaining client data. I/O device 103 may transmit a message to a navigation device (e.g., a location identification device 4) that is associated with the client. The message may comprise the request for location data. Upon receiving the message, the device may identify and transmit location data to I/O device 103. I/O device 103 may then provide the location data to location data obtaining device 106.

In S504, potential location determining device 107 may determine one or more potential locations of the client using the location data. The one or more potential locations of the client may be locations (e.g., a city, a landmark, an intersection) that the client may move past at a future time (e.g., a few second, minutes, or hours later). Accordingly, determining the one or more potential locations may comprise predicting those locations that the client may move past at a future time. For example, if the location data indicates that the client is located a mile west of Newton, Mass. and is driving eastbound, then potential location determining device 107 may predict that the client may pass by Newton, Mass. Thus, a potential location of the client may be Newton, Mass. As another example, if the location data indicates that the client is located a mile west of Newton, Mass. and is driving eastbound at a speed of 60 mph, then potential location determining device 107 may predict that the client may pass by Brookline, Mass., which is located a couple of miles to the east of Newton, Mass. Based on the client's speed of movement, potential location determining device 107 may predict that the client is likely to pass by a location that is further east than Newton, Mass. (e.g., Brookline, Mass.).

After determining the one or more areas of interest and the one or more potential locations of the client, in S505, data transmitting device 108 may transmit to central control center 200 at least one of the client data, the one or more areas of interest, the location data, and the one or more potential locations. The at least one of the client data, the one or more areas of interest, the location data, and the one or more potential locations may be referred to as "transmitted data." Specifically, data transmitting device 108 may use I/O device 103 to transmit the transmitted data to central control center 200. As described above, central control center 200 may comprise an advertising server, an advertising network, a daily deal website, or other entity that provides advertising services. Central control center 200 may receive the plurality of commercial messages. Specifically, I/O device 203 may receive the transmitted data and provide the transmitted data to CPU 202.

In certain configurations, the client may select central control center 200, such that central control center 200 comprises at least one of an online advertising server, an online advertising network, a daily deal website, or other entity that provides advertising services through wireless channels. In particular configurations, transmitting the transmitted data to central control center 200 may comprise transmitting the transmitted data to broadcaster 2 to be transmitted to central control center 200. Thus, the transmitted data may first be transmitted to broadcaster 2, and broadcaster 2 may subsequently transmit the transmitted data to central control center 200.

Figure 4:
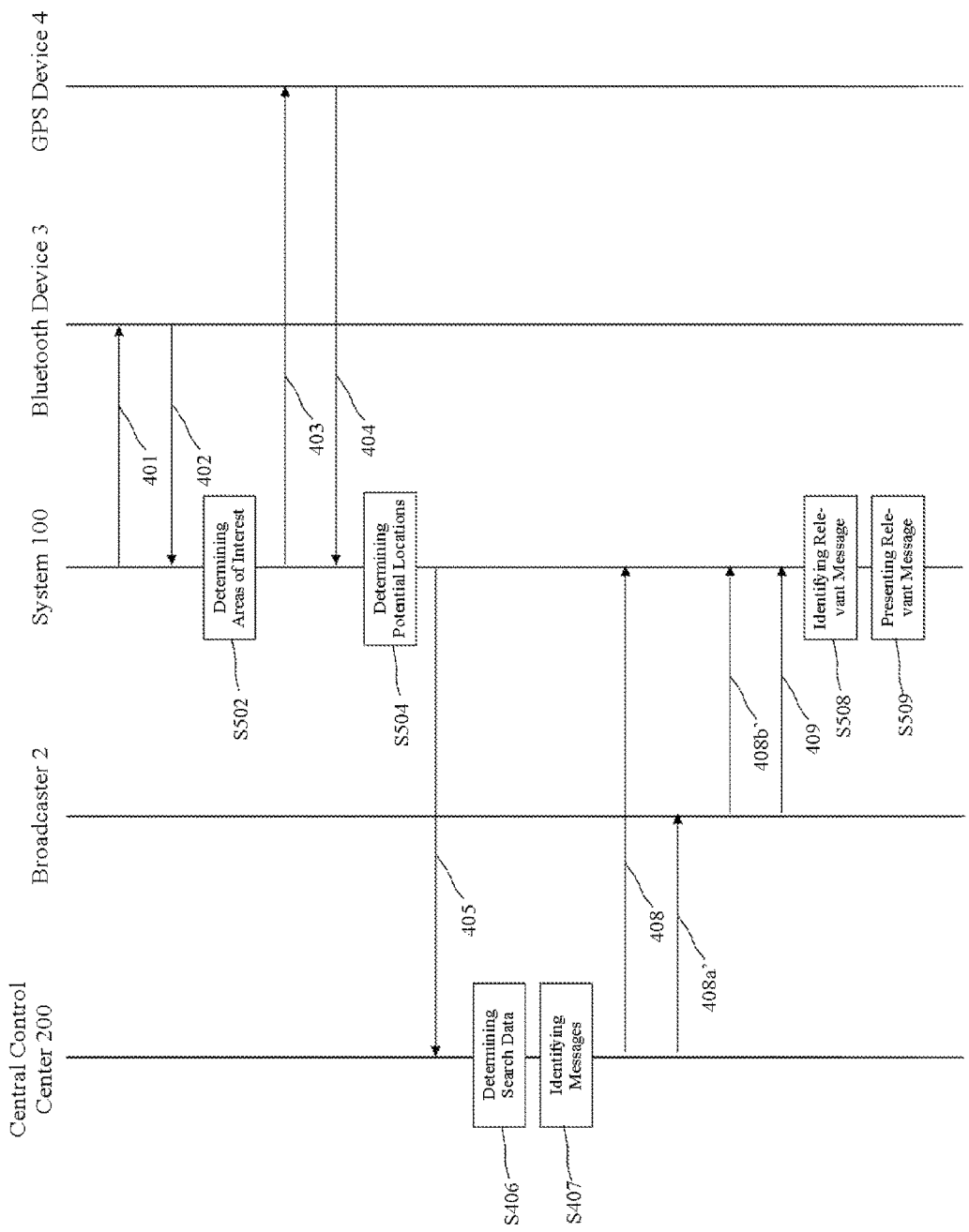
FIG. 4 depicts a flow scheme of providing a relevant commercial message.

Central control center 200 may be configured to determine search data using the transmitted data and identify a plurality of commercial messages using the search data. Thus, after receiving the transmitted data, central control center 200 may determine the search data and identify the plurality of commercial messages. Identifying the plurality of commercial messages may comprise searching for commercial messages associated with a tag corresponding to the search data. The plurality of commercial messages may be selected from the commercial messages that are stored in commercial message repository 205. FIG. 4, described below, provides a more detailed view of determining the search data and identifying the plurality of commercial messages.

After identifying the plurality of commercial messages, central control center 200 may then transmit the plurality of commercial messages to system 100. In certain configurations, transmitting the plurality of commercial messages to system 100 may comprise transmitting the plurality of commercial messages to broadcaster 2 to be transmitted to system 100. Thus, the plurality of commercial messages may first be transmitted to broadcaster 2, and broadcaster 2 may subsequently transmit the plurality of commercial messages to system 100.

Figure 7:
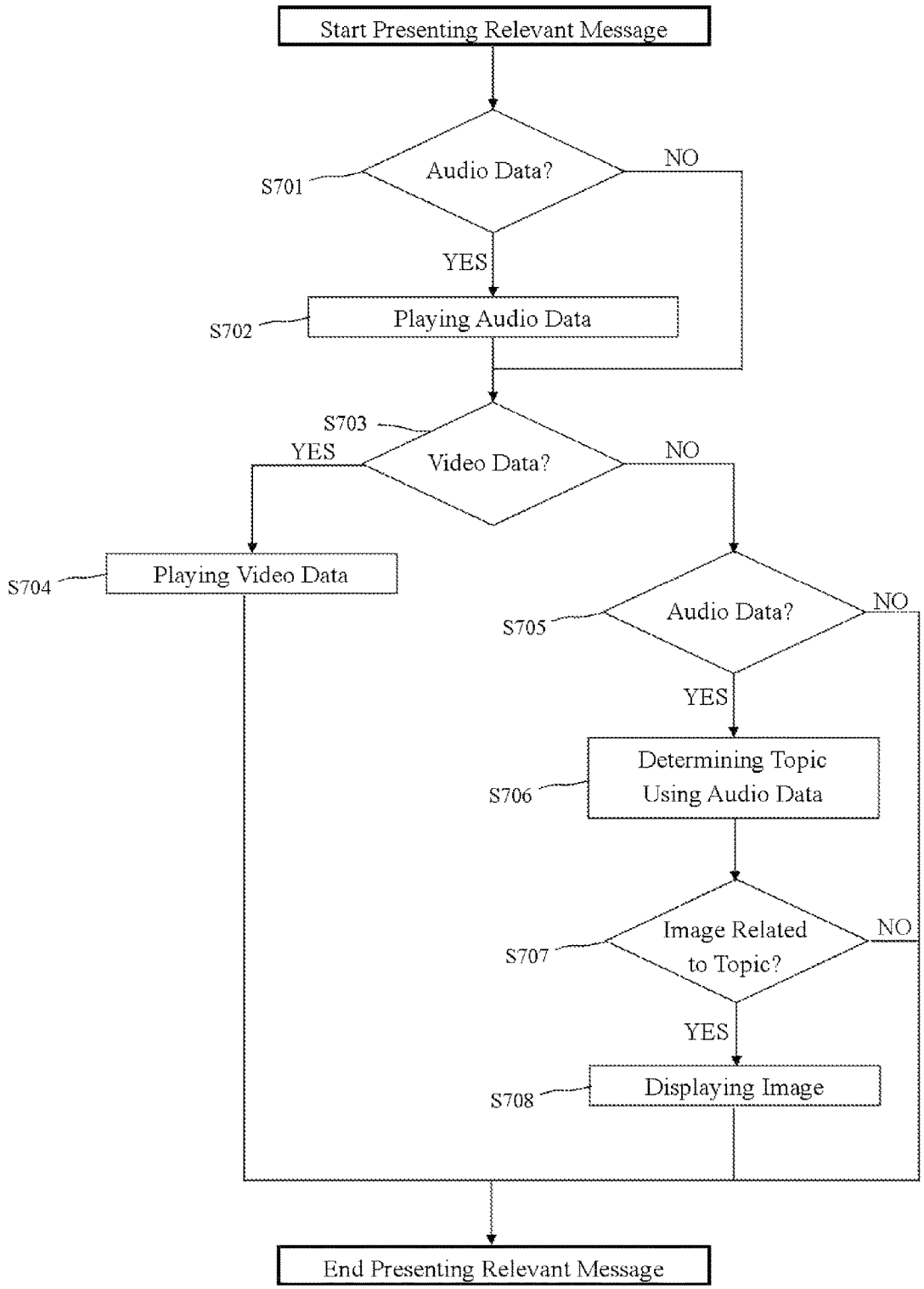
FIG. 7 illustrates a process of presenting a relevant commercial message.

In S506, system 100 may receive the plurality of commercial messages. In particular, I/O device 103 may receive the plurality of commercial messages and provide the plurality of commercial messages to CPU 102. In S507, system 100 may receive a signal to present a commercial message. In particular I/O device 103 may receive the signal and provide the signal to CPU 102. System 100 may receive the signal from broadcaster 2. As described above, broadcaster 2 may be a radio broadcaster or a television broadcaster. Broadcaster 2 may transmit the signal to system 100 when broadcaster 2 or a party affiliated with broadcaster 2 wants system 100 to present a commercial message to the client (e.g., when broadcaster 2 pauses its regular programming for a commercial break). In S508, relevant message identifying device 110 may identify a relevant commercial message from the plurality of commercial messages, such that the relevant commercial message is associated with a tag corresponding to at least one of the one or more areas of interest and a tag corresponding to at least one of the one or more potential locations. Then, in S509, relevant message presenting device 112 may present the relevant commercial message in response to receiving the signal. FIG. 7, described below, provides a more detailed view of S509.

In certain configurations, S501/S502 may be performed concurrently or after S503/S504. In other configurations, S505 may be omitted. In such configurations, S506 may be performed before, during, or after any one of S501-S507. Moreover, in such configurations, central control center 200 may be configured to identify a plurality of commercial messages based on information other than the transmitted data. This information may be received from broadcaster 2, system 100, personal client devices 3, location identification devices 4, or other devices connected to cloud 5. For example, central control center 200 may receive information from broadcaster 2 that informs central control center that broadcaster 2 only broadcasts to clients located in a region of the United States (e.g., the East Coast or a particular state in the United States). Accordingly, central control center 200 may identify a plurality of commercial messages, wherein each of the plurality of commercial messages is associated with a tag corresponding to that region of the United States. As another example, central control center 200 may receive a request for commercial messages relevant to a region of the United States (e.g., commercial messages that provide information about commercial products or services that are offered in a region of the United States). Central control 200 may then identify a plurality of commercial messages, wherein each of the plurality of commercial messages is a commercial message relevant to that region of the United States. In still other configurations, S505 may be omitted, and central control center 200 may be configured to identify a plurality of commercial messages based on a predetermined scheme. For example, identifying the plurality of commercial messages may comprise selecting a random sampling of commercial messages from the commercial messages stored in commercial messages repository 205. In particular configurations, S507 may be performed before, during, or after any one of S501-S508. In still other configurations, S507 may be omitted.

Figure 6:
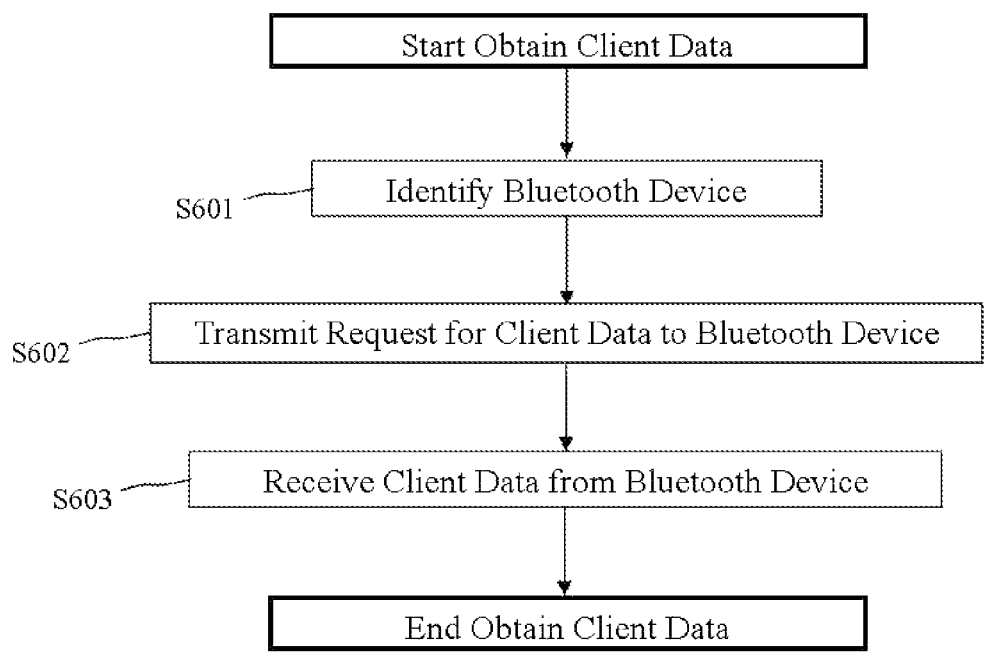
FIG. 6 illustrates a process of obtaining client data of a client.

Referring now to FIG. 6, which provides a detailed view of S501, client data obtaining device 104 may obtain client data of a client. In S601, client data obtaining device 104 may identify a personal client device 3 associated with the client (e.g., owned by the client, operated by the client). As described above, the personal client device 3 may be a general purpose computing device, a specialized computing device, a mobile device, a wireless device, a wired device, and other devices equipped with BLUETOOTH® or NFC technology. In S602, client data obtaining device 104 may transmit a request for client data to the personal client device 3. In particular, I/O device 103 may transmit a message to the personal client device 3, wherein the message may comprise the request for client data. Upon receiving the message, the personal client device 3 may identify the client data and transmit a response to system 100. The response may comprise the client data. In S603, client data obtaining device 104 may receive the response. In particular, I/O device 103 may receive the response and provide the client data to client data obtaining device 104.

In certain configurations, client data obtaining device 104 may repeat S601-S603 with another personal client device 3, other device connected to system 100, or other wireless device in cloud 5. If the client is operating a vehicle (e.g., driving a vehicle), then such device may comprise, for example, a device associated with another client in the vehicle. Such device may also be, for example, an additional device associated with the client.

Referring now to FIG. 7, which provides a more detailed view of S509, relevant message presenting device 112, acting as audio playing device 113 and video playing device 114, may present a relevant commercial message to a client. In S701, relevant message presenting device 112 may determine whether the relevant commercial message comprises audio data. The audio data may comprise one or more audio clips. If the relevant commercial message comprises audio data (S701: YES), then the process may proceed to S702. In S702, audio playing device 113 may play the audio data. In particular, audio playing device 113 may use a transducer (e.g., speaker) to produce sound corresponding to the one or more audio clips. If the relevant commercial message does not comprise audio data (S701: NO), then the process may proceed directly to S703.

In S703, relevant message presenting device 112 may determine whether the relevant commercial message comprises video data. The video data may comprise one or more images corresponding to the audio data. In particular, the video data may be synchronized with the audio data. If the relevant commercial message comprises video data (S703: YES), then the process may proceed to S704. In S704, video playing device 114 may play the video data. In particular, video playing device 114 may display the one or more images on a display. In certain configurations, S701/S702 and S703/S704 may be performed concurrently, such that audio playing device 113 and video playing device 114 may play the audio data and the video data concurrently.

If the relevant commercial message does not comprise video data (S703: NO), then the process may proceed to S705. In S705, the same process as that represented by S701 may be performed. In particular, relevant message presenting device 112 may again determine whether the relevant commercial message comprises audio data. If the relevant commercial message comprises audio data (S705: YES), then the process may proceed to S706. In S706, relevant message presenting device 112 may determine a topic of the relevant commercial message using the audio data. The topic may describe subject matter of the relevant commercial message. Specifically, if the relevant commercial message provides information about a particular commercial offering, then the topic may be the particular commercial offering. Thus, a topic for a commercial message about a cheesecake may be the cheesecake. Then, in S707, relevant message presenting device 112 may identify an image related to the topic. In particular, relevant message presenting device 112 may search a repository for images related to the topic. The repository may be a local repository or a remote repository. The local repository may be a physical or logical memory that is directly connected to system 100. The remote repository may be a physical or logical memory located on a remote server or other device in cloud 5. Each image in the repository may comprise metadata that describes the image's content. Thus, searching the images in the repository may comprise examining each image's metadata to determine whether it is related to the topic.

If relevant commercial message presenting device 112 identifies an image related to the topic (S707: YES), then the process may proceed to S708, where video playing device 114 may display the identified image on a display. In certain configurations, S701/S702 and S703/S705/S706/S707/S708 may be performed concurrently. In such configurations, video playing device 114 may display the identified image while audio playing device 113 plays the audio data.

If the relevant commercial message does not comprise audio data (S705: NO), then the process may terminate. Similarly, if relevant commercial message presenting device 112 does not identify an image related to the topic (S707: NO), then the process might terminate. In certain configurations, S703-S708 may be omitted. Thus, the process may terminate after S702. In other configurations, S705-S708 may be omitted. Thus, the process may terminate if the relevant commercial message does not comprise video data (S703: NO).

In particular configurations, the display may comprise a touchscreen display. The touchscreen display may provide the client with additional information about the subject matter of the relevant commercial message (e.g., a commercial offering) if the client touches a spot on the touchscreen display.

Figure 8:
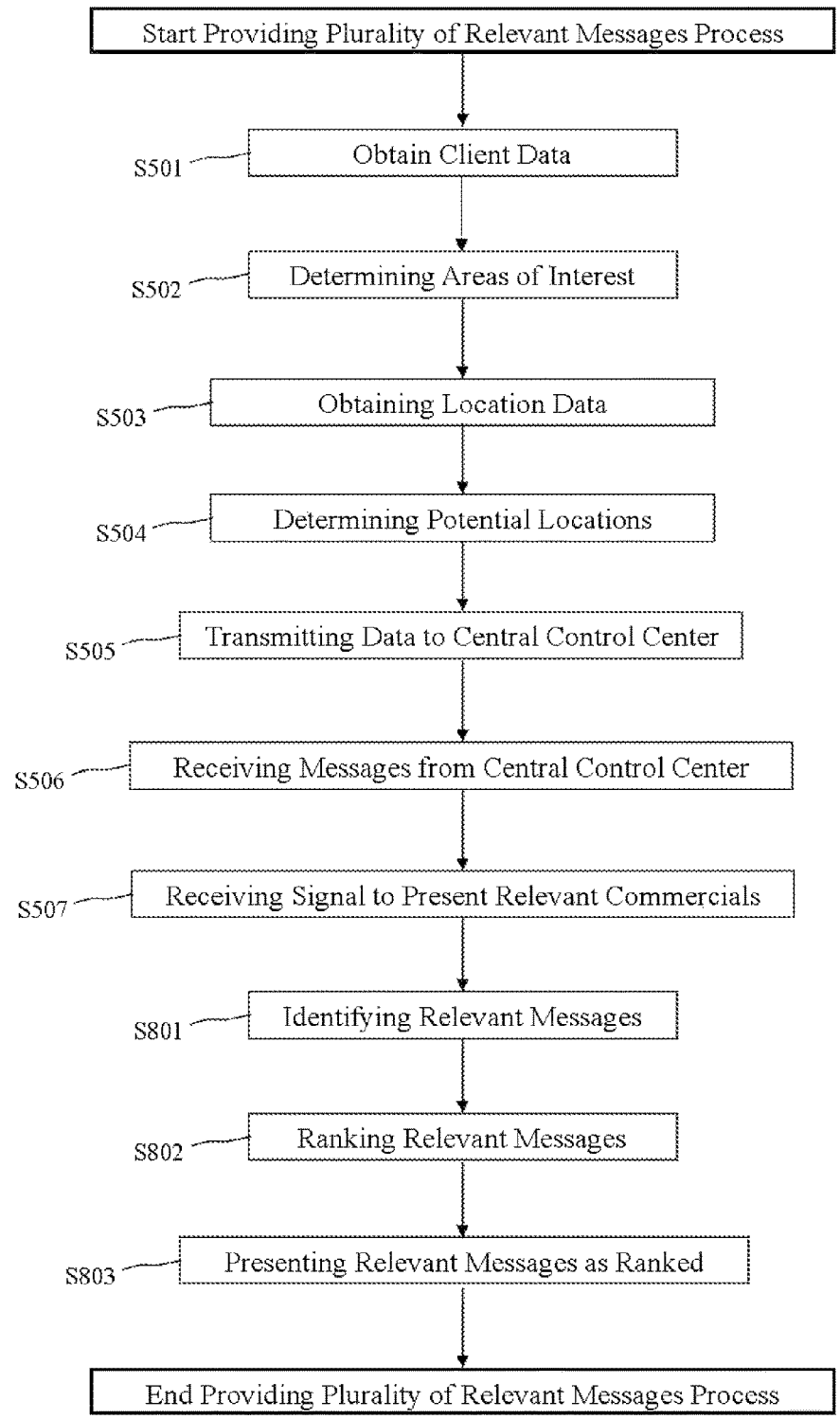
FIG. 8 illustrates a process of obtaining client data and location data of a client and using the client data and location data to provide a plurality of relevant commercial messages.

Referring now to FIG. 8, a process of obtaining client data and location data of a client and using the client data and location data to provide a plurality of relevant commercial messages now is described. As described above, in S501, client data obtaining device 104 may obtain client data of the client. In S502, interest determining device 105 may determine one or more areas of interest of the client using the client data. In S503, location data obtaining device 106 may obtain location data of the client. In S504, potential location determining device 107 may determine one or more potential locations of the client using the location data. In S505, data transmitting device 108 may transmit transmitted data to central control center 200. And, in S506, I/O device 103 may receive a plurality of commercial messages from central control center 200 and provide the plurality of commercial messages to CPU 102.

In S801, relevant message identifying device 110 may identify a plurality of relevant commercial messages. Similar to S508, relevant message identifying device 110 may identify relevant commercial messages from the plurality of commercial messages, such that each of the relevant commercial messages is associated with a tag corresponding to at least one of the one or more areas of interest and a tag corresponding to at least one of the one or more potential locations. Then, in S802, CPU 102 may rank the relevant commercial messages. In particular, CPU 102 may assign higher rankings to relevant commercial messages that are associated with more corresponding tags (e.g., tags that correspond to an area of interest of the client, tags that correspond to a potential location of the client). Thus, a relevant commercial message that is associated with two corresponding tags may have a higher ranking than a relevant commercial message that is associated with one corresponding tag. CPU 102 may also assign higher rankings to relevant commercial messages that are associated with more tags corresponding to potential locations of the client. Thus, a relevant commercial message that is associated with two potential locations of the client may have a higher ranking than a relevant commercial message that is associated with only one potential location of the client. Alternatively, CPU 102 may assign higher rankings to relevant commercial messages that are associated with more tags corresponding to areas of interests of the client. Thus, a relevant commercial message that is associated with a tag corresponding to two areas of interest of the client may have a higher ranking than a relevant commercial message that is associated with one area of interest of the client. Moreover, CPU 102 may assign higher rankings to relevant commercial messages that are associated with more key tags. Key tags may be tags that correspond to areas of interest of the client that are specially marked (e.g., marked as important, marked as strong). Key tags may also be tags that correspond to potential locations of the client that are specially marked (e.g., marked as most likely or possible).

Subsequently, in S803, relevant message presenting device 112 may present the relevant commercial messages as ranked (e.g., relevant message presenting device 112 may present each of the relevant commercial messages based on their rankings). In particular, relevant message presenting device 112 may perform S701-S708, as depicted in FIG. 7, for each of the relevant commercial messages in the order that they are ranked. In certain configurations, relevant message presenting device 112 may only present a subset of the relevant commercial messages that comprises those relevant commercial messages with the highest rankings.

Referring now to FIG. 4, a flow scheme of providing a relevant commercial message now is described. In FIG. 4, system 100 may provide a relevant commercial message to a client. The client may be driving a vehicle eastbound on Route 9, a mile to the west of Newton, Mass. The client may have a personal client device 3 and a location identification device 4 in the vehicle.

In order to provide the relevant commercial message, system 100 may obtain client data and location data of the client. Specifically, system 100 may identify the personal client device 3 in the vehicle. System 100 may transmit a request for client data to the personal client device 3. A signal 401 may represent this request. Upon receiving signal 401, the personal client device 3 may identify the client data and transmit a response to system 100, wherein the response comprises the client data. A signal 402 may represent this response. As described above, the client data may include information about attributes of the client or attributes of a device associated with the client. Attributes of the client may comprise, for example, "chocolate lover" and "pet owner." The device associated with the client may be, for example, the vehicle; thus, attributes of the vehicle may comprise, for example, "Toyota," "Prius," and "Hybrid." In addition, system 100 may identify the location identification device 4 in the vehicle. System 100 may transmit a request for location data to the location identification device 4. A signal 403 may represent this request. Upon receiving signal 403, the location identification device 4 may transmit a response comprising the location data to system 100. As described above, the location data may comprise a geographic location of the client (e.g., a mile to the west of Newton, Mass.) and a current direction of movement of the client (e.g., eastbound). The response from the GPS device 4, represented by a signal 404, may be received by system 100.

Then, in S502, interest determining device 105 may determine one or more areas of interest of the client using the client data. As described above, determining one or more areas of interest may comprise identifying areas of interests that are associated with a particular attribute of the client. Thus, if the attributes of the client comprise "chocolate lover" and "pet owner," then interest determining device 105 may determine areas of interest comprising "chocolate desserts" and "pet food." Additionally, if the attributes of the vehicle comprise "Toyota," "Prius," and "Hybrid," then interest determining device 105 may determine client data comprising "green energy" and "sedans." Then, in S504, potential location determining device 107 may determine one or more potential locations of the client using the location data. Determining one or more potential locations may comprise predicting or approximating locations that the client may shortly pass by. Thus, if the location data indicates that the client is located a mile west of Newton, Mass. and is driving eastbound, then potential location determining device 107 may predict that the client may pass by Newton, Mass.

After determining the one or more areas of interest and the one or more potential locations, system 100 may transmit at least one of the client data, the one or more areas of interest, the location data, and the one or more potential locations to central control center 200. As noted above, the at least one of the client data, the one or more areas of interest, the location data, and the one or more potential locations may be referred to as "transmitted data." System 100 may provide the transmitted data to system 100 via a signal 405.

Central control center 200 may receive the transmitted data and determine search data. In particular, I/O device 203 of central control center 200 may receive the transmitted data and provide the transmitted data to CPU 202. CPU 202, acting as search data determining device 206 may use the transmitted data to determine search data. In particular, if the transmitted data comprises the client data, then determining the search data may involve determining one or more additional areas of interest of the client using the client data, and the search data may comprise the one or more additional areas of interest. The one or more additional areas of interest may comprise areas of interest of the one or more areas of interest. For example, if the attributes of the client comprise "chocolate lover" and "pet owner," then search data determining device 206 may determine search data comprising "chocolate desserts" and "pet supplies." As another example, if the attributes of the vehicle comprise "Toyota," "Prius," and "Hybrid," then search data determining device 206 may determine search data comprising "green energy" and "Japanese cars." If the transmitted data comprises the location data, then determining the search data may involve determining one or more additional potential locations of the client using the location data, and the search data may comprise the one or more additional potential locations. The one or more additional potential locations may comprise potential locations of the one or more potential locations. For example, if the location data indicates that the client is located a mile west of Newton, Mass. and is driving eastbound, then search data determining device 206 may determine search data comprising "Newton, Mass." and "Brookline, Mass." Performing such determinations may be similar to S502 and S504, described above.

If the transmitted data comprises the client data and the one or more areas of interest, then determining the search data may further involve comparing the one or more areas of interest and the one or more additional areas of interest to identify one or more common areas of interest. The one or more common areas of interest may be areas of interest of the one or more areas of interest that are also of the one or more additional areas of interest (e.g., areas of interest determined by both interest determining device 105 and search data determining device 206). Thus, if the one or more areas of interest comprise "chocolate desserts," "pet food," "green energy," and "sedans" and the one or more additional areas of interest comprise "chocolate desserts," "pet supplies," "green energy," and "Japanese cars," then search data determining device 206 may determine common areas of interest comprising "chocolate desserts" and "green energy." Accordingly, the search data may comprise at least one of the one or more areas of interest, the one or more additional areas of interest, and the one or more common areas of interest. If the transmitted data comprises the location data and the one or more potential locations, then determining the search data may further involve comparing the one or more potential locations and the one or more additional potential locations to identify one or more common potential locations. The one or more common potential locations may be potential locations of the one or more potential locations that are also of the one or more additional potential locations (e.g., potential locations determined by both potential location determining device 107 and search data determining device 207. Thus, if the one or more potential locations comprise "Newton, Mass." and the one or more additional potential locations comprise "Newton, Mass." and "Brookline, Mass.," then search data determining device 206 may determine a common potential location comprising "Newton, Mass." Accordingly, the search data may comprise at least one of the one or more potential locations, the one or more additional potential locations, and the one or more common potential locations.

Then, CPU 102, acting as messages identifying device 207 may identify a plurality of commercial messages. As described above, the plurality of commercial messages may be selected from the commercial messages that are stored in commercial message repository 205. Each of the plurality of commercial messages may be associated with a tag corresponding to the search data. As described above, a tag may be a term that describes a commercial message (e.g., describes a commercial offering that is discussed in the commercial message). Thus, for example, a commercial message about a special on a chocolate cheesecake at The Cheesecake Factory in Newton, Mass. may be associated with tags "chocolate cheesecake" and "Newton, Mass." Those tags may correspond to the search data, which may comprise "chocolate desserts" and "Newton, Mass." Accordingly, that commercial message may be included in the plurality of commercial messages identified by messages identifying device 207.

CPU 102, acting as messages transmitting device 208, may subsequently transmit the plurality of commercial messages to system 100. In particular, messages transmitting device 208 may use I/O device 203 to transmit a signal 408 to system 100, wherein signal 408 carries the plurality of commercial messages. Alternatively, messages transmitting device 208 may transmit the plurality of commercial messages to broadcaster 2 to be transmitted to system 100. Thus, messages transmitting device 208 may transmit the plurality of commercial messages via a signal 408a' to broadcaster 2. Broadcaster 2 may then transmit the plurality of commercial messages to system 100 via a signal 408b'.

Broadcaster 2 may transmit a signal to present a commercial message to system 100. As described above, broadcaster 2 may transmit a signal to present a commercial message to system 100 when broadcaster 2 or a party affiliated with broadcaster 2 wants system 100 to present a commercial message to the client. For example, if broadcaster 2 is a radio broadcaster, then it may send a signal to present a commercial message to system 100 when it pauses its music programming for a commercial break. A signal 409 may represent the signal to present a commercial message.

System 100 may receive the plurality of commercial messages and the signal to present a commercial message. Subsequently, in S508, system 100 may identify a relevant commercial message from the plurality of commercial messages, such that the relevant commercial message is associated with a tag corresponding to at least one of the one or more areas of interest and a tag corresponding to at least one of the one or more potential locations. For example, continuing for the examples above, the commercial message about a special on a chocolate cheesecake at The Cheesecake Factory in Newton, Mass. may be identified as a relevant commercial message. In particular, that commercial message may be associated with the tag "chocolate cheesecake," which may correspond to the area of interest "chocolate desserts," and the tag "Newton, Mass.," which may correspond to the tag "Newton, Mass." Then in S509, system 100 may present the relevant commercial message in response to receiving the signal to present the relevant commercial message.

The flowcharts and diagrams in FIGS. 1-8 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
    receiving a communication from a client at a device associated with the client;
    determining an identity of the client using a voice recognition device;
    obtaining client data corresponding to the client;
    determining one or more areas of interest of the client using the client data;
    obtaining location data corresponding to the client, the location data comprising a geographic location of the client and a current direction of movement of the client;
    determining one or more potential locations of the client using the location data;
    receiving a plurality of commercial messages from a central control center, each of the plurality of commercial messages associated with a plurality of tags corresponding to areas of interest of the client and the one or more potential locations of the client;
    ranking the plurality of messages based upon the number of tags corresponding to the areas of interest of the client and the one or more potential locations of the client;
    identifying a relevant commercial message comprising audio data from the plurality of commercial messages, such that the relevant commercial message is associated with a tag corresponding to at least one of the one or more areas of interest and a tag corresponding to at least of the one or more potential locations;
    wherein the relevant commercial message comprises the one of the plurality of messages having the most tags corresponding to the areas of interest of the client and the one or more potential locations of the client;
    determining whether the commercial message comprises video data;
    in response to determining that the commercial message does not comprise video data, identifying a topic of the commercial message using the audio data;
    searching a local repository to identify an image related to the topic;
    simultaneously displaying the image and presenting the relevant commercial message to the device associated with the client; and
    transmitting information from the device indicating that the relevant commercial message was played at a particular time at a particular place to the client.

2. The method of claim 1,
    wherein the client data comprises information corresponding to at least one of: an attribute of the client, and an attribute of a device associated with the client;
    wherein the location and movement data further comprises a speed of movement of the client.

3. The method of claim 2, wherein the device associated with the client comprises a vehicle operated by the client;
    wherein the attribute of the device is selected from a group comprising: a make of the vehicle, a model of the vehicle, a year of the vehicle, and a type of the vehicle.

4. The method of claim 1, wherein obtaining the client data comprises:
    transmitting a request for the client data to a wireless device associated with the client; and
    receiving a response from the wireless device,
    wherein the response comprises the client data.

5. The method of claim 1, further comprising:
    receiving a signal to present a commercial message from a radio broadcaster; and
    presenting the relevant commercial message in response to receiving the signal.

6. The method of claim 1, further comprising:
    transmitting to the central control center at least one of the client data, the one or more areas of interest, the location data, and the one or more potential locations;
    wherein the central control center comprises at least one of: an online advertising server, an online advertising network, and a daily deal website;
    wherein the central control center is configured to:
        determine search data using the at least one of the client data, the one or more areas of interest, the location data, and the one or more potential locations; and
        identify the plurality of commercial messages using the search data.

7. The method of claim 1, further comprising:
    receiving confirmation that the relevant commercial message was played at a given time and at a given place to the client; and
    using the confirmation to invoice an advertiser associated with the relevant commercial message.

8. A system comprising:
    a first obtaining device configured to receive a communication from a client at a device;
    a first determining device configured to determine an identity of the client using a voice recognition device;

the first obtaining device configured to obtain client data corresponding to the client;
the first determining device configured to determine one or more areas of interest of the client using the client data;
a second obtaining device configured to obtain location data corresponding to the client, the location data comprising a geographic location of the client and a current direction of movement of the client;
a second determining device configured to determine one or more potential locations of the client using the location data;
a first receiving device configured to receive a plurality of commercial messages from a central control center, each of the plurality of commercial messages associated with a plurality of tags corresponding to areas of interest of the client or the one or more potential locations of the client;
a ranking device configured to rank the plurality of messages based upon the number of tags corresponding to the areas of interest of the client or the one or more potential locations of the client;
an identifying device configured to identify a relevant commercial message comprising audio data from the plurality of commercial messages, such that the relevant commercial message is associated with a tag corresponding to at least one of the one or more areas of interest and a tag corresponding to at least one of the one or more potential locations;
wherein the relevant commercial message comprises the one of the plurality of messages having the most tags corresponding to the areas of interest of the client or the one or more potential locations of the client;
the identifying device being further configured to:
 determine whether the commercial message comprises video data;
 in response to determining that the commercial message does not comprise video data, identify a topic of the commercial message using the audio data;
 search a local repository to identify an image related to the topic;
 a presentation device associated with the client configured to simultaneously display the image and present the relevant commercial message; and
 a transmitting device configured to transmit information from the device indicating that the relevant commercial message was played at a particular time at a particular place to the client.

9. The system of claim 8,
wherein the client data comprises information corresponding to at least one of: an attribute of the client, and an attribute of a device associated with the client;
wherein the location and movement data further comprises a speed of movement of the client.

10. The system of claim 9,
wherein the first receiving device comprises a smart radio within a vehicle operated by the client;
wherein the smart radio is configured to receive the plurality of commercial messages from a stationary broadcaster; and
wherein the smart radio comprises the identifying device that is configured to identify the relevant commercial message from the plurality of commercial messages received at the smart radio.

11. The system of claim 10, wherein the first obtaining device comprises:
a request transmitting device configured to transmit a request for the client data to a wireless device associated with the client; and
a client data receiving device configured to receive a response from the wireless device,
wherein the response comprises the client data.

12. The system of claim 10, further comprising:
a second receiving device configured to receive a signal to present a commercial message from a radio broadcaster; and
a presenting device configured to present the relevant commercial message in response to receiving the signal.

13. The system of claim 10, further comprising:
a transmitting device configured to transmit to the central control center at least one of the client data, the one or more areas of interest, the location data, and the one or more potential locations,
wherein the central control center comprises at least one of: an online advertising server, an online advertising network, and a daily deal website;
wherein the central control center is configured to:
 determine search data using the at least one of the client data, the one or more areas of interest, the location data, and the one or more potential locations; and
 identify the plurality of commercial messages using the search data.

14. A computer program product comprising:
a non-transitory computer readable storage medium having computer readable program code embodied therewith, the computer readable program code comprising:
 computer readable program code configured to receive a communication from a client at a device associated with the client;
 computer readable program code configured to determine an identity of the client using a voice recognition device;
 computer readable program code configured to obtain client data corresponding to the client;
 computer readable program code configured to determine one or more areas of interest of the client using the client data;
 computer readable program code configured to obtain location data corresponding to the client, the location data comprising a geographic location of the client and a current direction of movement of the client;
 computer readable program code configured to determine one or more potential locations of the client using the location data;
 computer readable program code configured to receive a plurality of commercial messages from a central control center, each of the plurality of commercial messages associated with a plurality of tags corresponding to areas of interest of the client or the one or more potential locations of the client;
 computer readable program code configured to rank the plurality of messages based upon the number of tags corresponding to the areas of interest of the client or the one or more potential locations of the client;
 computer readable program code configured to identify a relevant commercial message comprising audio data from the plurality of commercial messages, such that the relevant commercial message is associated with a tag corresponding to at least one of the one or more areas of interest and a tag corresponding to at least one of the one or more potential locations;

wherein the relevant commercial message comprises the one of the plurality of messages having the most tags corresponding to the areas of interest of the client or the one or more potential locations of the client;

computer readable program code configured to determine whether the commercial message comprises video data;

computer readable program code configured to, in response to determining that the commercial message does not comprise video data, identify a topic of the commercial message using the audio data;

computer readable program code configured to search a local repository to identify an image related to the topic;

computer readable program code configured to simultaneously display the image and present the relevant commercial message to the device associated with the client; and computer readable program code configured to transmit information from the device indicating that the relevant commercial message was played at a particular time at a particular place to the client.

15. The computer program product according to claim 14, wherein the client data comprises information corresponding to at least one of: an attribute of the client, and an attribute of a device associated with the client;

wherein the location and movement data further comprises a speed of movement of the client.

16. The computer program product according to claim 15, wherein the device associated with the client comprises a vehicle operated by the client;

wherein the attribute of the device associated with the client is selected from a group comprising: a make of the vehicle, a model of the vehicle, a year of the vehicle, and a type of the vehicle.

17. The computer program product according to claim 14, wherein the computer readable program code configured to obtain client data comprises:

computer readable program code configured to transmit a request for the client data to a wireless device associated with the client; and computer readable program code configured to receive a response from the wireless device, wherein the response comprises the client data.

18. The computer program product according to claim 14, further comprising:

computer readable program code configured to receive a signal to present a commercial message from a radio broadcaster; and computer readable program code configured to present the relevant commercial message in response to receiving the signal.

19. The computer program product according to claim 14, further comprising:

computer readable program code configured to transmit to the central control center at least one of the client data, the one or more areas of interest, the location data, and the potential location, wherein the central control center comprises at least one of: an online advertising server, an online advertising network, and a daily deal website;

wherein the central control center is configured to:
determine client data using the at least one of the search data, the one or more areas of interest, the location data, and the one or more potential locations; and
identify the plurality of commercial messages using the search data.

\* \* \* \* \*